Aug. 18, 1931.　　　M. B. BLEECKER　　　1,819,863
HELICOPTER
Filed Feb. 15, 1927　　　2 Sheets-Sheet 1
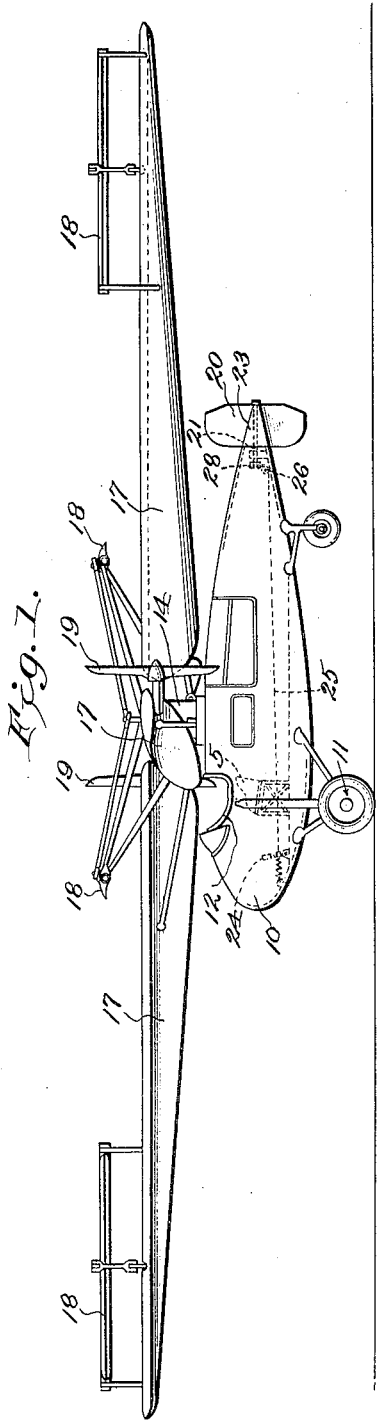
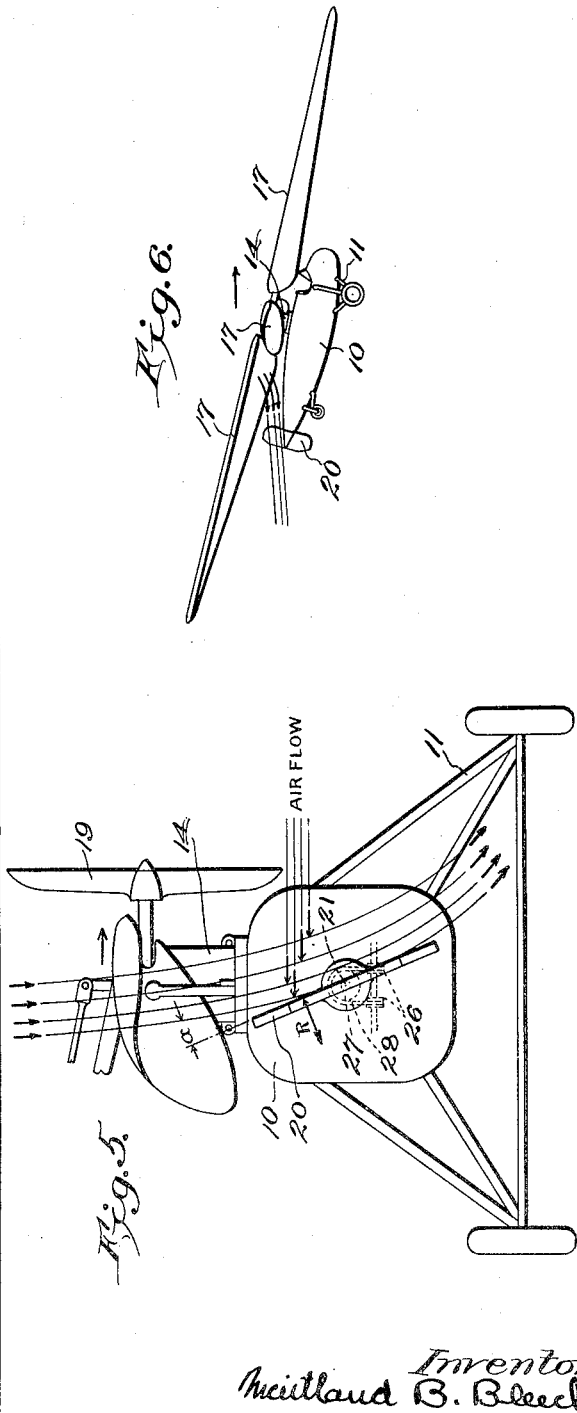
Inventor
Maitland B. Bleecker
By Albert Teck
Attorney.

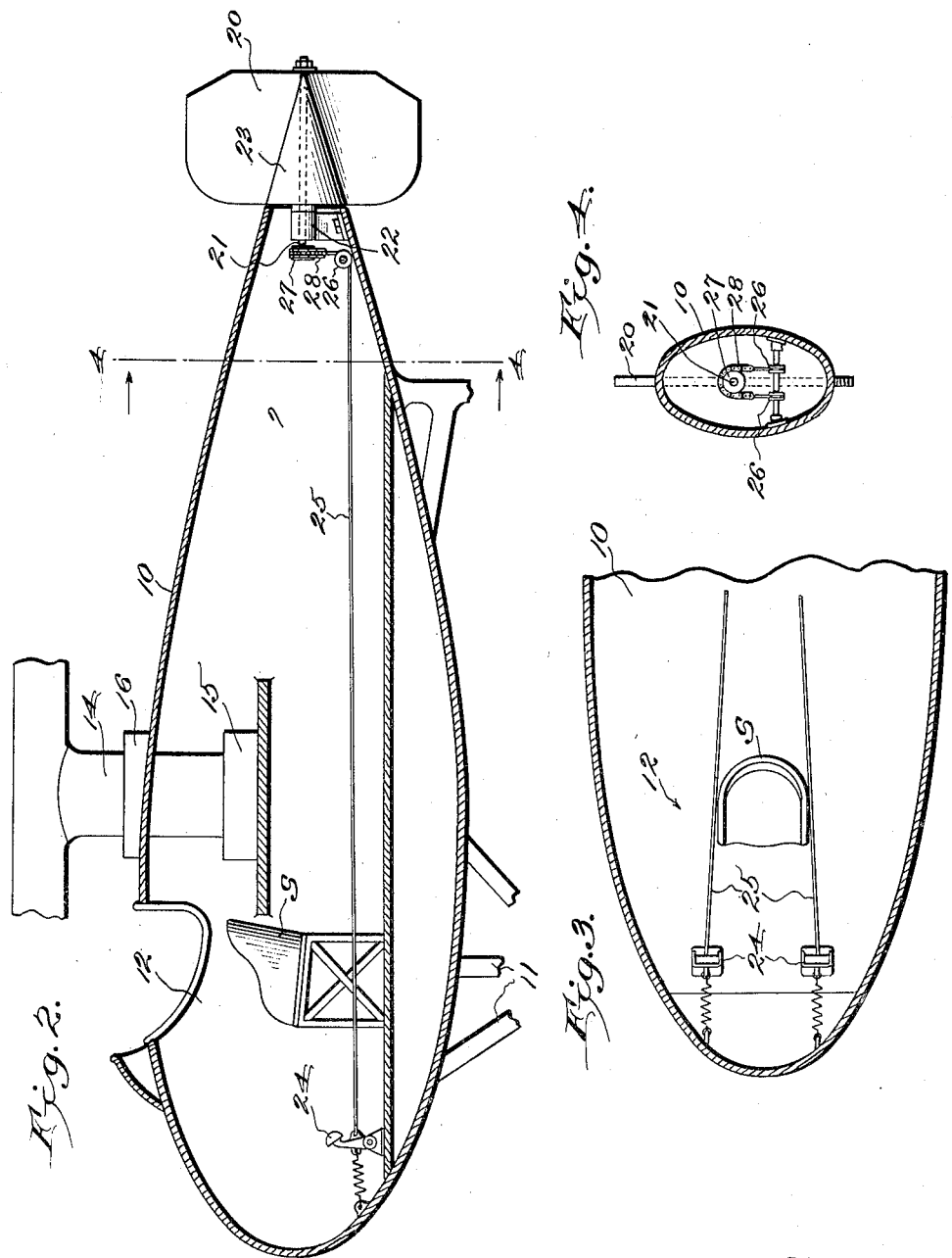

Patented Aug. 18, 1931

1,819,863

UNITED STATES PATENT OFFICE

MAITLAND B. BLEECKER, OF HEMPSTEAD, NEW YORK

HELICOPTER

Application filed February 15, 1927. Serial No. 168,332.

This invention relates to certain improvements in helicopters; and the nature and objects of the invention will be readily recognized and understood by those skilled in the arts involved in the light of the following explanation and detailed description of the accompanying drawings illustrating what I at present consider to be the preferred embodiments or mechanical and aerodynamical expressions of my invention from among various other forms, arrangements, combinations and constructions of which the invention is capable within the spirit and scope thereof.

In a type of helicopter, a normally horizontally disposed body or fuselage rotatably carries or mounts a vertically disposed mast, column, or shaft having an air screw or aerofoils mounted thereon for rotation therewith in a horizontal plane above the body or fuselage to develop a direct vertical lift for vertical translation, the body or fuselage being freely rotatably mounted or suspended on the the rotatable mast for movement in a horizontal plane therearound independently of the rotation of this mast. However, due to bearing friction and other contributing causes, with the mast or column and aerofoils carried thereby in rotation, the body or fuselage freely swingable on the mast has a tendency to and will swing or rotate on and around the mast in the direction of rotation thereof; and the present invention is directed to overcoming this tendency of the body or fuselage to rotate with the mast, by the provision of control means through the medium of which the body or fuselage can be maintained in the desired position against such rotational tendencies, or can be swung to and maintained in any desired position and direction on and around its axis of rotation by such means.

A feature of the invention is the provision on a body or fuselage which is freely rotatably mounted on a vertically disposed mast or column carrying aerofoils for rotation in a horizontal plane thereabove, of a vertically disposed control surface rotatable on a horizontal axis and acted upon by the airflow from the rotating aerofoils to produce a moment about the axis of rotation of the fuselage sufficient to overcome the tendency of the fuselage to swing on the mast in the direction of mast rotation.

A further feature and characteristic of the invention resides in providing a normally vertically disposed control surface at the tail of a fuselage or body with the surface rotatable around the longitudinal axis of the fuselage, with such body or fuselage freely rotatably mounted on a mast carrying aerofoils for rotation in a horizontal plane above the fuselage, so that by rotating such surface in the proper direction it is acted upon by the airflow from the aerofoils to set up a moment acting upon the fuselage sufficient to overcome the tendency of the fuselage to swing on the mast in the direction of mast rotation; or the surface can be rotated in either direction, to the right or left, to set up a moment acting on the fuselage to swing the same in a desired direction and to maintain it in a desired position.

A further feature of the invention is in the provision of a mechanically simple and aerodynamically efficient design of and mounting for such a fuselage or body control surface, together with positive and efficient pilot controlled operating mechanism for the control surface in order to develop positive and responsive pilot control over the direction of rotation and position of the fuselage or body.

With the foregoing, and certain other features and objects in view which will be readily recognized by those familiar with this art from the following explanation, the invention consists in certain novel features in design and arrangements of elements, as will be more fully and particularly referred to and specified hereinafter.

Referring to the accompanying drawings:

Fig. 1 is a view in side elevation of a type of helicopter including a fuselage or body having a control surface of the invention mounted thereon, a pilot controlled operating mechanism for such surface being more or less diagrammatically indicated by dotted lines.

Fig. 2 is a view, more or less diagrammatical, in vertical longitudinal section through the body or fuselage of Fig. 1, with the control surface of the invention thereon, and showing a form of mounting for such surface together with a form of pilot controlled operating mechanism therefor.

Fig. 3 is a fragmentary section of the forward portion of the fuselage showing the pilot actuated control pedals for the fuselage control surface and portions of the operating cables connected therewith, all more or less diagrammatically shown.

Fig. 4 is a transverse section through the fuselage taken on the line 4—4, of Fig. 2, and showing the operating shaft of the control surface with the operating mechanism for rotating the same.

Fig. 5 is a view in end or tail elevation, more or less diagrammatical, of the body or fuselage of Fig. 1 with the control surface of the invention in operative position and relation acted upon by the airflow from the rotating aerofoils, only one of which is indicated, with the helicopter in vertical translation or hovering flight, the direction of airflow acting upon the control surface being indicated by arrows.

Fig. 6 is a view in side elevation, more or less diagrammatical, of the helicopter of Fig. 1 in horizontal translation and the fuselage control surface acted upon by the combination of forward velocity and rotating aerofoil airflow to maintain the fuselage in the direction of flight, arrows indicating the direction of airflow with respect to the fuselage control surface.

A type and design of helicopter has been selected and is disclosed in the accompanying drawings, with a body or fuselage control surface of the invention mounted thereon and embodied therein, purely by way of example and not of limitation, because the problems solved and disadvantages overcome by the invention are met with and encountered in this type in an accentuated or high degree, and therefore the type serves to more clearly demonstrate and bring forth the principles and various features of the invention. It will be understood, therefore, that the invention is not limited to the type of helicopter or aircraft of the disclosed example, but in principle and aerodynamical expression is capable of adaptation to and embodiment in other types of helicopters or aircraft generally where found desirable or expedient, as will be recognized and understood by those skilled in the aeronautical art, and the invention contemplates and includes such adaptations and embodiments.

In the type of helicopter disclosed, referring to Figs. 1 and 2 of the accompanying drawings in particular, a body or fuselage 10, of more or less conventional design and of any desired type of construction, is provided and includes the landing gear or chassis 11 at the forward portion thereof with a pilot's or control cockpit 12 disposed, in this instance, in the fuselage above such landing gear. To the rear of cockpit 12 at the intermediate portion of fuselage 10, a mast, column or shaft 14, is rotatably mounted within and vertically disposed in position extending upwardly from and a distance above the body or fuselage 10. The mast or column 14 is rotatably mounted or journaled on and in the fuselage by means of the lower or end bearing 15 and the bearing 16 spaced a distance upwardly of the mast from bearing 16, as diagrammatically shown by Fig. 2 of the drawings. A series of aerofoils 17 are mounted extending radially from and at equally spaced intervals around the mast or column 14 for rotation in and through a horizontal plane above the body or fuselage, with and on the rotatable mast 14. The aerofoils 17 are rotatable around their longitudinal axes for varying their angles of attack, respectively, and each aerofoil 17 is provided with a control or auxiliary surface 18 for and through the medium of which the respective angles of attack can be varied and controlled by operating mechanism not here shown or described as forming no part of the present invention.

The aerofoils 17 are rotated in a horizontal plane on and around the rotatable mast or column 14 as an axis, by the propellers 19 mounted on, in the present instance, opposite aerofoils 17 for rotation in a vertical plane to draw the aerofoils around and through a horizontal plane on mast 14 as an axis. Any suitable source of power is provided for driving propellers 19, such for example as a motor (not shown) mounted on the aerofoils, column or other elements, and operatively connected with propellers 19 by any suitable or desired mechanism (not shown) as will be readily understood. The rotation of aerofoils 17 in a horizontal plane results in the development of a direct vertical lift by which vertical translation or flight of the helicopter is obtained, and by suitable operation of auxiliary aerofoils 18 to vary the angles of attack of the rotating aerofoils 17, a horizontal component can be established in the desired direction to secure horizontal translation or flight, all of which will be understood by those skilled in the art and requires no detailed exposition here.

The rotational mounting of mast or column 14 on and in body or fuselage 10 with the fuselage suspended and freely swingable or rotatable on and around this mast as an axis independently of the rotation of the mast and aerofoils, results in flight in the tendency of the fuselage 10 to swing or rotate around and on mast 14, due mainly to bearing friction at and between mast 14 and the bearings 15 and 16 on fuselage 10, in the direction of mast rotation. Further, the freely swinging mounting and suspension of the body or fuselage 10 on mast 14, leaves the same independent of the directional control of the helicopter as determined by the operation of rotating aerofoils 14, and hence subject to various forces acting thereon to establish varying moments in either direction causing swinging or rotation of the fuselage around mast 14 as an axis, so that it is desirable and necessary to provide for complete directional control of the fuselage or body during flight, vertical, hovering, and horizontal.

This required directional control of the freely swinging or rotating fuselage or body 10 is provided by and forms the subject of the present invention, and a mechanical and aerodynamical expression of one form of which it is capable is shown in the accompanying drawings and will now be described and explained. At the tail of body or fuselage 10, a vertically disposed tail or fuselage control surface 20 is mounted for rotation on a horizontal axis disposed longitudinally of the body or fuselage, and in the example hereof this control surface is mounted on and fixed to a shaft 21 for rotation therewith. The shaft 21 is disposed longitudinally of the fuselage 10 at the rear or tail thereof and is rotatably mounted or journaled in any suitable bearings, such as the bearings 22 shown in Fig. 2 of the drawings, with the shaft extended rearwardly from the fuselage. The tail or fuselage control surface 20 is mounted on the rearwardly extended portion of shaft 21 and in the example hereof, control surface 20 extends above and below shaft 21 and the longitudinal axis of the fuselage, with shaft 21 disposed and forming an axis intermediate or centrally of the surface. The control surface 20 on shaft 21 is formed and provided with a control or hub portion 23 around shaft 21, faired with and forming a rearward continuation and carrying out the streamline contour of the fuselage or body 10, as will be clear by reference to Figs. 1 and 2 of the drawings in particular.

Pilot controlled mechanism for operating fuselage control surface 20 is mounted in the fuselage for operation by a pilot from the cockpit or control point 12 thereof. As an example, such mechanism can take the form of the foot pedals 24 in cockpit 12 for operation by a pilot in and from cockpit seat 5, with cables 25 extending rearwardly through fuselage 10 from the pedals 24 to and under rollers or pulleys 26 below and adjacent the inner end of shaft 21, which carries a pulley, gear, sprocket or the like 27, with a belt or chain 28 extending therearound and having its ends operatively coupled to the ends of the pedal actuated cables 25. Thus, by operating foot pedals 24, moving one forwardly and the other rearwardly in the usual manner, cables 25 are actuated to rotate shaft 21, through pulley or gear 27 and belt or chain 28, to in turn swing or rotate control surface 20 on a horizontal axis longitudinally of the fuselage. Obviously, any other desired type or arrangement of pilot controlled operating mechanism for rotating or swinging fuselage control surface around its axis can be employed, and there is no intention to limit the invention in any sense to the mechanism illustrated and described herein.

With a helicopter of the type here presented as an example, in flight, either vertical, horizontal, or hovering, the rotating aerofoils 17 cause a downward displacement of air resulting in a downward airflow, which airflow, due to that characteristic of rotating aerofoils or screws known as "race rotation", will have a lateral deflection or turning movement outwardly in the direction of rotation of the aerofoils, as clearly shown by Fig. 5 of the drawings, in which the airflow direction is indicated by arrows, and an arrow indicates the direction of rotation of aerofoils 17. The freely swinging or rotating fuselage 10 mounted on rotating mast 14 has a tendency, due to bearing friction and other causes as previously explained, to swing around mast 14 in the direction of mast rotation, that is, referring to Fig. 5, to swing to the right around mast 14, and to overcome this tendency control surface 20 is operated to rotate or swing the same toward the left, with this control surface disposed at an angle of attack to the downwardly and laterally moving airflow within which it is disposed. With control surface 20 swung or rotated around its horizontal axis to the position shown in Fig. 5 the airflow acting thereon develops a resultant air force on this surface (tail of fuselage 10) acting in a direction to establish a moment about the fuselage vertical axis to overcome the tendency of the fuselage to rotate to the right and to stop the fuselage from swinging and hold the same in the desired position, as will be clear by reference to the force vector R of Fig. 5. The magnitude of the resultant force from control surface 20 can be varied by increasing or decreasing the angle of the surface 20 to the airflow, and can be sufficient to not only hold the fuselage in position, but to rotate or swing the same around mast 14 as an axis to any desired position.

In horizontal translation or flight of the helicopter, as diagrammatically shown by Fig. 6, the plane of aerofoils 14 is tilted or inclined downwardly in the direction of translation, and it is necessary and desirable for obvious reasons to maintain fuselage 10 pointing or alined in the direction of flight against forces tending to swing the same and again by rotating control surface 20 around its horizontal axis in either direction a force can be developed acting laterally of the fuselage in the desired direction to swing and hold the same to and in the required position. With horizontal flight and the longitudinal axis of fuselage 10 tilted downwardly, the combined down flow from aerofoils 14, together with horizontal flow due to translation, strikes the tail or control surface 20 on its upper side when tilted or swung on its axis from the vertical, and thus the airflow acts at an angle of attack to the surface to develop a resultant force acting laterally of the fuselage at the tail thereof. While the surface 20 can be rotated in either direction it is preferred and more efficient to rotate or tilt the same in a direction away from the direction of "race rotation" of the airflow, as shown by Fig. 5, so that the plane of surface 20 is inclined along the direction of airflow, in order to utilize and take full advantage of such characteristic of the airflow.

The form and design of control surface 20, as well as its mounting, can be changed and varied over a wide range to meet the operating conditions and requirements of the aircraft on which installed or embodied. For example, surface 20 is not required as shown here to extend equal distances above and below its axis of rotation, but can extend or be disposed solely above, solely below, or unequally above and below, and is not limited to the exact location and mounting on a body as here shown.

While the control surface 20 is shown as substantially of flat section, such showing is purely diagrammatical, as a cambered or aerofoil section for control surface 20 is contemplated and included in and by the invention, in order to secure from its use a greater resultant force than a flat section, for the same angle of attack and airflow velocity, and therefore permitting a reduction in control surface size over one of flat section.

It is also evident that various other changes, modifications, variations, and substitutions might be resorted to without departing from the spirit and scope of my invention, and hence I do not wish to limit myself to the exact and specific disclosures hereof.

What I claim is:

1. In a helicopter, aerofoils rotatable in a horizontal plane around a vertical axis, a fuselage below said aerofoils freely swingable around their axis of rotation, and a normally vertically disposed control surface mounted on the fuselage for rotating around the longitudinal axis of the fuselage, said control surface within and acted upon by the downwardly directed aerofoil airflow for controlling swinging of the fuselage.

2. In a helicopter, a normally horizontally disposed fuselage, aerofoils mounted on said fuselage and rotatable in a horizontal plane thereabove, said fuselage freely horizontally swingable around the axis of rotation of said aerofoils, a normally vertically disposed control surface mounted on the tail of said fuselage extending above and below and rotatable around the longitudinal axis of the fuselage, said control surface within the airflow from said aerofoils, and pilot controlled means for rotating said control surface to cause the air flow from said aerofoils to react thereon to develop a force acting laterally of the fuselage.

3. In aircraft, a fuselage, a vertically disposed control surface mounted at the tail of the fuselage for swinging around the fore and aft axis of the fuselage, said control surface provided with a hub portion forming a rearward stream-line continuation of the fuselage, and pilot controlled means for swinging said control surface.

Signed at Hempstead, Long Island, county of Nassau, State of New York, this 8th day of February, 1927.

MAITLAND B. BLEECKER.